(No Model.)

J. F. WOLLENSAK.
ELECTRIC CUT-OUT.

No. 419,487. Patented Jan. 14, 1890.

Witnesses:

Inventor:
John F. Wollensak,
By Banning & Banning & Payson,
Att'ys

UNITED STATES PATENT OFFICE.

JOHN F. WOLLENSAK, OF CHICAGO, ILLINOIS.

ELECTRIC CUT-OUT.

SPECIFICATION forming part of Letters Patent No. 419,487, dated January 14, 1890.

Application filed October 15, 1889. Serial No. 327,105. (No model.)

*To all whom it may concern:*

Be it known that I, JOHN F. WOLLENSAK, a citizen of the United States, residing at Chicago, in the county of Cook and State of Illinois, have invented certain new and useful Improvements in Electric-Wire Cut-Outs, of which the following is a specification.

The object of my invention is to provide a compact and substantial device for connecting and disconnecting the wire in an electric circuit; and my invention consists in the features and details of construction hereinafter described and claimed.

Figure 1:
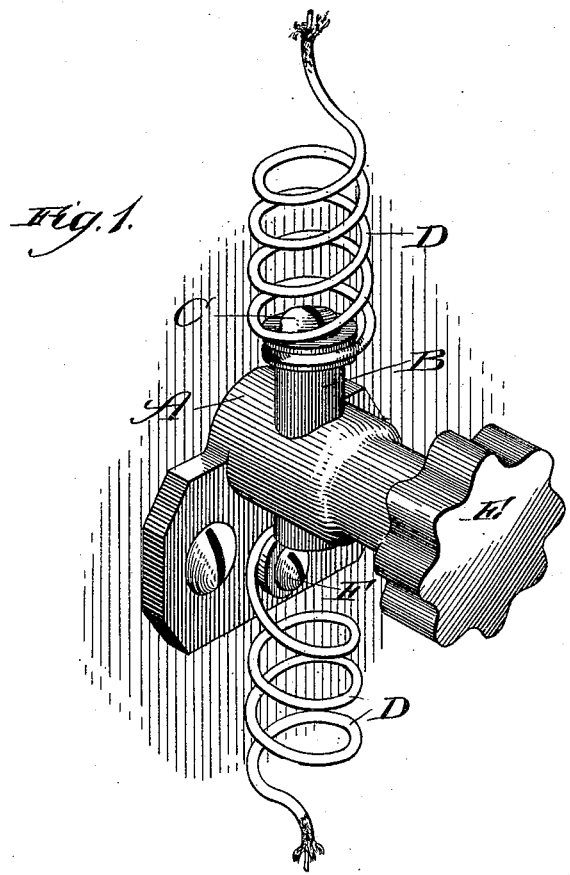
Figure 2:
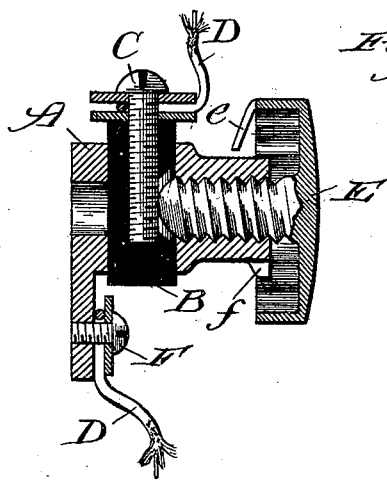

In the drawings, Figure 1 is a perspective view of my device enlarged, and Fig. 2 is a vertical section showing the arrangement and operation of the vairous parts.

In making my improved electric-wire cut-out I preferably make a bracket A, which may be attached to the wall, or to a desk or table, or to electric-light fixtures, or to any fixture in any other convenient place. I preferably provide the bracket with a hole and arrange therein an insulating-piece B, made of any proper insulating substance. This insulating-piece is also preferably provided with a hole extending almost through the same longitudinally, in which a binding-screw C may be arranged, capable of being screwed in or out. One wire D of the circuit is attached to and held by this binding-screw so as to convey the current of electricity into the same. As this binding-screw is entirely insulated from the bracket, it is obvious that the circuit will be broken as soon as the current enters it, unless some means are provided for forming a connection to permit the current to pass on its way through the circuit. To provide these means I preferably arrange a thumb-screw E, that may be screwed into or out of the bracket, and which is also preferably provided with a lug $e$, which comes into contact with the lug $f$ on the bracket when the thumb-screw has been run out a certain distance, so as to prevent it from being farther screwed out. While this arrangement is not new in the present invention, it is a convenient way of insuring the retention of the thumb-screw in the bracket and of preventing it from being removed by children or careless persons. The insulating-piece is cut away, as shown in Fig. 2, so that the binding-screw is exposed on its side toward the thumb-screw. When the thumb-screw is run in a sufficient distance, it will therefore come into metallic contact with the binding-screw. As soon as this occurs the current will pass into the thumb-screw, and from it to the bracket and to a binding-post F, which holds the wire for the continuation of the circuit. In this way, by turning the thumb-screw in or out of the bracket, the circuit may be completed or interrupted, as desired.

What I regard as new, and desire to secure by Letters Patent, is—

In an electric cut-off, the combination of a bracket, an insulating-piece, arranged in the bracket, a binding-screw arranged in the insulating-piece and exposed in one portion, and a thumb-screw that may be turned into the bracket until it connects with the exposed portion of the binding-screw, and out until it disconnects therefrom, substantially as described.

JOHN F. WOLLENSAK.

Witnesses:
LATHROP P. FARNHAM,
GEORGE S. PAYSON.